United States Patent [19]

Droux et al.

[11] 4,031,443

[45] June 21, 1977

[54] APPARATUS FOR POSITIONALLY CONTROLLING A MOVABLE HEAD ASSEMBLY

[75] Inventors: Jacques Pierre Léon Droux, Paris; René Jean Rodier, Bobigny, both of France

[73] Assignee: Compagnie Honeywell Bull (Societe Anonyme), Paris, France

[22] Filed: May 22, 1975

[21] Appl. No.: 579,862

[52] U.S. Cl. ............................. 318/561; 318/617; 318/687; 360/78

[51] Int. Cl.² .................. G05B 13/00; G11B 21/08

[58] Field of Search .......... 318/561, 617, 687, 571; 360/78

[56] References Cited

UNITED STATES PATENTS

| | | | |
|---|---|---|---|
| 3,622,767 | 11/1971 | Koepcke | 318/561 X |
| 3,699,555 | 10/1972 | DuVall | 318/617 X |
| 3,729,668 | 4/1973 | Brette | 318/561 |
| 3,731,177 | 5/1973 | Commander et al. | 318/561 X |
| 3,809,986 | 5/1974 | Visser | 318/561 |

OTHER PUBLICATIONS

"Disk File Track Access Control", Commander et al., IBM Tech. Discl. Bull., vol. 6, No. 12, pp. 4064–4065, May, 1974.

*Primary Examiner*—Robert J. Hickey
*Attorney, Agent, or Firm*—Cameron, Kerkam, Sutton, Stowell & Stowell

[57] ABSTRACT

An apparatus for positionally controlling the movable head assembly of a magnetic disc memory unit. In a first state, the head assembly is accelerated under substantially free conditions. In a second or deceleration state, the assembly speed is compared with and regulated by a series of theoretical speeds set in accordance with the actual speed attained by the movable head assembly during the first state.

7 Claims, 10 Drawing Figures

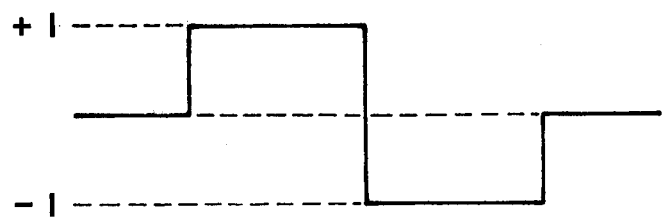
FIG·1a
PRIOR ART
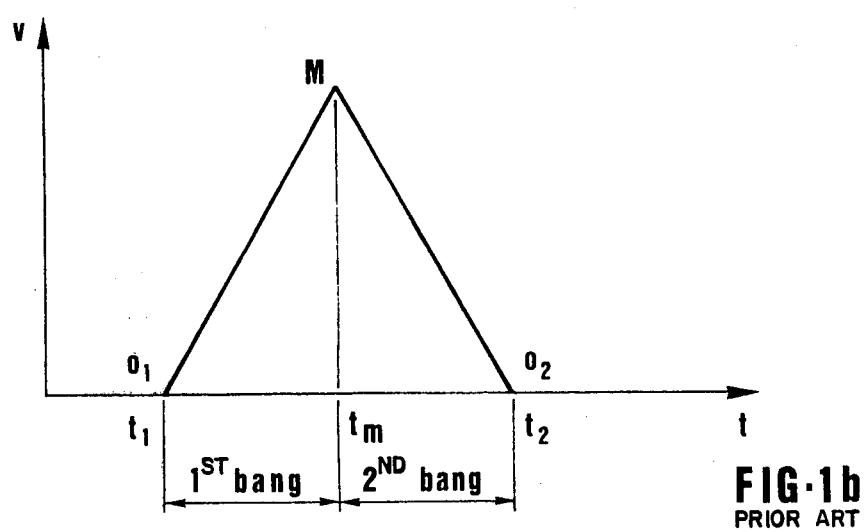
FIG·1b
PRIOR ART
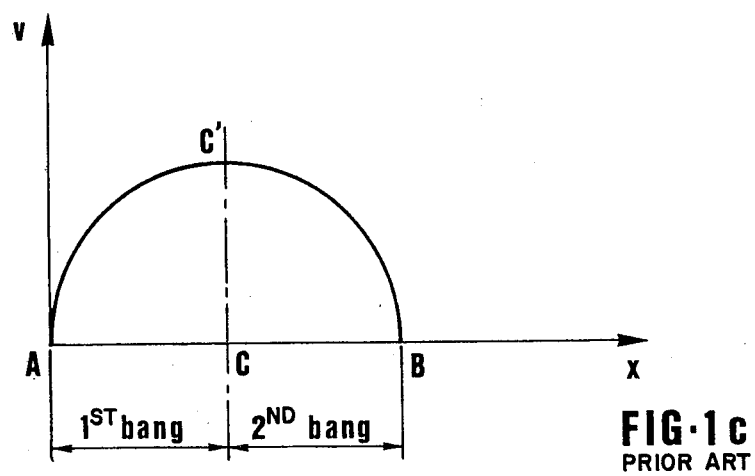
FIG·1c
PRIOR ART

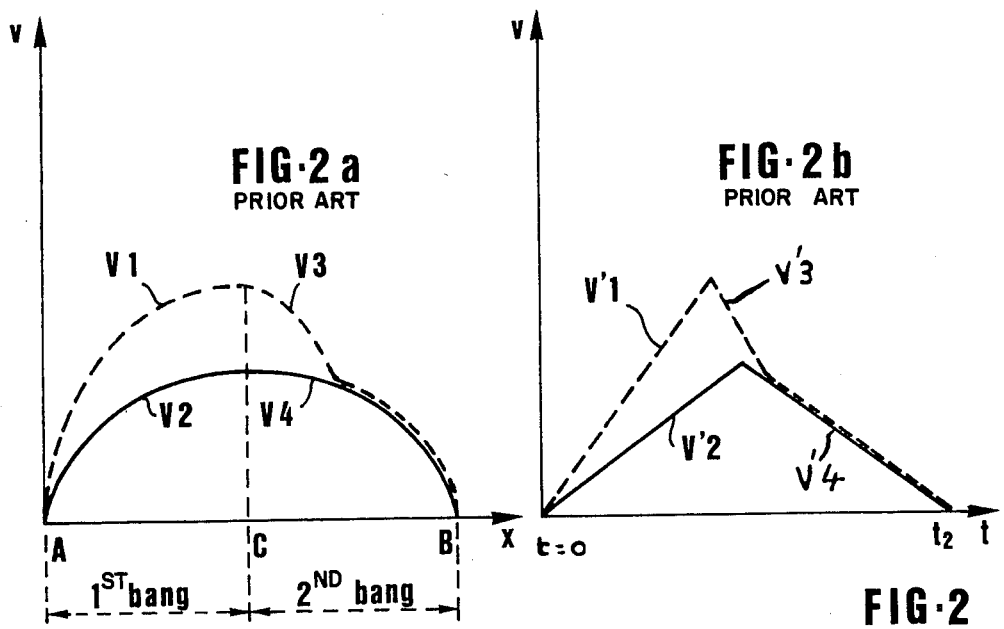
FIG·2
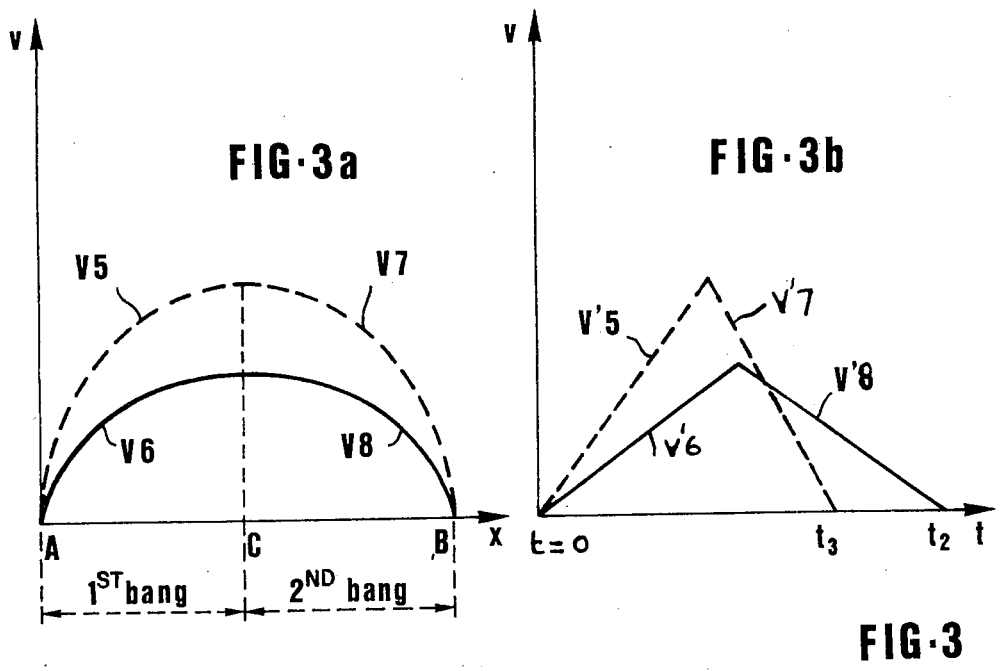
FIG·3

APPARATUS FOR POSITIONALLY CONTROLLING A MOVABLE HEAD ASSEMBLY

BACKGROUND OF THE INVENTION

The present invention relates generally to an apparatus for controlling the movement and positioning of a translationally movable system and more particularly to a control apparatus for the read-write heads of a data processing memory system.

In the present data processing systems, magnetic disc memories are being used with increased frequency. Storage capacity and the comparatively short access times to the data contained on the discs are the primary reasons for the usage increase.

All disc memories have or are characterised by a "mean access time." Mean access time is the time required by the heads, which read from or write upon the magnetic disc, to move from an outside track on the disc and gain access to a data item contained on the central track. The time is measured from the moment the heads receive an order from the processing system to seek the data item. The central track of the disc has a serial number equal to the mean of the outside track serial numbers. For example, if there are two hundred recording tracks numbered from 0 to 200, then the central track is track 100.

In practice, the mean access time is determined primarily by two factors. One is the average time taken by the disc to complete one revolution. The second is the average time taken by the magnetic heads to move from the outside track to the central track.

Much development work is presently directed towards reducing mean access time. It is, or course, possible to reduce the average revolution time of a disc by increasing the speed of rotation. However, the mechanical stresses exerted on the disc severely limit this approach. Thus, the perference is to reduce the average time necessary to move the magnetic heads by improving the head control apparatus.

It is to be understood that the primary concern is to reduce the time required to move the magnetic heads from a starting track to a destination track, regardless of starting or destination track. Thus, reduction of mean access time, i.e., where the starting and destination tracks are an outside track and the central track, respectively, is a special case and only illustrative of the general objective.

A majority of head control apparatus includes a "voice coil" electrodynamic motor. The motor has a coil which moves linearly within a permanent magnet, defining a cylindrical core. The coil is mechanically linked to a carriage which bears the magnetic heads. Preferably, the carriage moves along two parallel rails. The coil, carriage and magnetic heads, in combination, define a movable head assembly. The movable head assembly also includes a transducer, which measures the assembly speed at any instant and produces a corresponding speed signal.

With the presently known control apparatus, a reduction in transit time is achieved by two-stage movement. The first stage is an acceleration stage, during which a positive current is applied to the coil of the motor. The speed of the movable head assembly or carriage, as a function of time, is substantially linear and increasing. Speed as a function of the position occupied by the movable assembly is parabolic and also increasing.

During the second stage of movement, or the deceleration stage, an opposite current is applied to the motor. Speed as a function of time and position, in this stage, is linear-decreasing and parabolic-decreasing, respectively. At the end of the second stage, the speed of the movable head assembly is sufficiently low to stop the heads above the selected disc track.

During the first stage, the control apparatus operates under conditions of freedom or, more particularly, is uncontrolled. Conversely, second stage operation is controlled and the speed of the movable assembly is governed to closely approximate speed under conditions of freedom.

Such a control apparatus is a "bang-bang" type. The first stage of the movement is termed the first bang, while the second phase is the second bang.

The known bang-bang control apparatus include means for applying constant current to the motor coil during the first stage of movement. During the second state, the amount of current is determined by comparing the actual speed of the carriage assembly with a theoretical reference speed. The theoretical reference speed is the speed at which the head assembly would be moving under free conditions.

More particularly, the known and existing control apparatus include an electric motor, a speed transducer or first generator for producing a signal representing the actual speed of the movable head assembly, a second generator for producing a signal representing a theoretical reference speed, a comparator for generating a signal representing the difference or error between the actual and theoretical reference speeds, and power means for amplifying the error signal from the comparator. The motor is driven by the amplified error signal.

These control apparatus are subject to a large number of disruptive phenomena of physical or mechanical origin, such as variations in the supply voltage to the motor, changes in the electrical and magnetic characteristics of the motor with time, changes in the mechanical characteristics of the carriage bearing the heads, sensitivity of the speed transducer, etc. The disruptive phenomena upset and vary the movement of the movable assembly.

To substantially avoid variance in movement, the theoretical reference speeds for the movable head assembly are chosen with respect to the least favorable operating conditions. However, under these conditions, it is virtually impossible to achieve an adequate reduction in actual transit times or mean access time.

SUMMARY OF THE INVENTION

In a principal aspect, the present invention is an apparatus for positionally controlling the movable head assembly of a magnetic disc memory. The control apparatus includes a motor for driving the movable head assembly, a transducer for producing a velocity signal representing the speed of the head assembly, a first and second memory, a comparator for comparing the velocity signal with a series of theoretical velocity signals, and means for controlling or effecting an acceleration and deceleration state.

During the acceleration state or first bang, the movable head assembly is driven under substantially free conditions. The second memory is connected to the comparator to receive an error signal representing the difference between actual and theoretical velocity signals. In response the second memory produces a reference signal which is received by the first memory. The first memory multiplies a series of arbitrary velocity signals by the reference signal to produce the theoretical velocity signals.

At inversion from acceleration to deceleration, the change-over error signal is stored in the second memory and the reference signal remains constant thereafter, i.e., during the second bang. During deceleration, the motor is driven by the error signal from the comparator, such that the speed of the movable head assembly follows or tracks the desired theoretical speeds.

It is thus an object of the present invention to substantially avoid the drawbacks and shortcomings of the presently known control apparatus by using the actual speed achieved by the head assembly during the first bang as a factor in determining the theoretical reference speeds for the movable head assembly during the controlled second bang.

These and other objects, features and advantages of the present invention will become apparent in the following description.

BRIEF DESCRIPTION OF THE DRAWING

A preferred embodiment of the present invention will be described, in detail, with reference to the drawing, wherein:

FIGS. 1a, 1b and 1c are graphs illustrating the basic principle of a bang-bang system; p FIGS. 2a and 2b are graphs illustrating speed as a function of time and position for prior art control apparatus of the bang-bang type;

FIGS. 3a and 3b are graphs illustrating speed as a function of time and position for the preferred embodiment of the present invention shown in FIG. 4;

DESCRIPTION OF A PREFERRED EMBODIMENT

Figure 6:
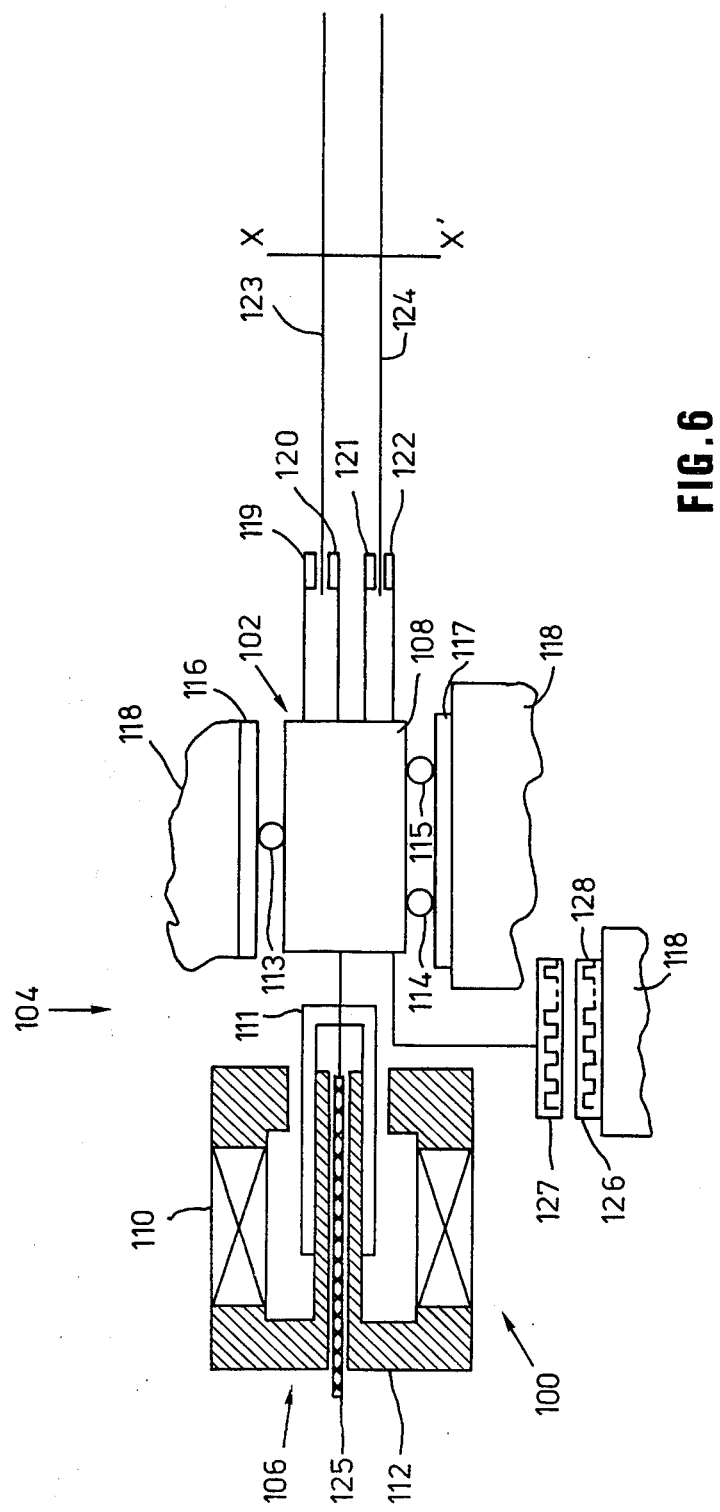
FIG. 6 is a simplified schematic diagram of a magnetic disc memory including the preferred embodiment of the present invention shown in FIG. 4.

Referring to FIG. 6, a preferred embodiment of the present invention is shown as an apparatus 100 for positionally controlling the movement of a head assembly 102. The movable head assembly 102 is a component of a magnetic disc memory, generally designated 104.

The movable head assembly 102 includes a linear electrodynamic motor 106 of the voice-coil type and a carriage 108. The motor 106 has a permanent magnetic 110, a movable coil 111 and a magnetic circuit 112. The coil 111 is connected to a current source 15 (shown in FIG. 4) and moves in response to the electromagnetic force created by a current pulse. The current polarity determines the direction of movement.

The movable coil 111 is attached mechanically to the movable carriage 108. The carriage 108 has rollers 113, 114, 115 and moves on the mounting rails 116, 117. The rails are secured on the frame 118 of the disc memory 104.

The movable carriage 108 carries four magnetic heads 119, 120, 121, 122. The magnetic heads 119–122 read and write information on the two faces of magnetic discs 123, 124. The two magnetic discs 123, 124 are driven, at a constant rotating speed, around an X'X rotational axis by an electric motor (not shown).

The movable coil 111 also includes a speed transducer 125. The speed transducer 125 is a small coil attached inside the movable coil 111. When the movable coil 111 moves, the speed transducer coil 125 delivers a tension which is directly proportional to the speed of the movable coil 111 and movable carriage 108.

A position transducer 126 is also mounted on the frame 118. The positioned transducer 126 includes a first member 127 linked mechanically to the movable carriage 108 and a second fixed member 128 attached to the frame 118. In this preferred embodiment, the position transducer 126 is a "Inductosyn" type transducer.

To better understand the features and advantages of the present invention, the operation of the magnetic disc assembly 104 will be generally and briefly described with reference to various known control apparatus. As an example, assume that the magnetic heads are to be shifted from a track A to a track B, along a straight path. Further assume that the control apparatus, in the first case to be considered, is uncontrolled, i.e., operates under conditions of freedom during both the first and second bang. Such operation is shown in FIGS. 1a, 1b l and 1c.

During the first bang, a positive current step (+I) is applied to the coil 111 of the motor 106. Referring to FIG. 1b, the speed of the carriage 108 as a function of time $t$ increases linearly, as represented by straight line $O_1M$, between times $t_1$ and and $t_m$, equaling $(t_1+t_2)/2$. At point C, the center between tracks A and B, and time $t_m$, the first bang terminates, the second bang begins and a negative current step (-I) is applied to the coil 111. The speed then drops linearly as a function of time $t$, as shown by a straight line $MO_2$, between times $t_m$ and $t_2$.

Curves $O_1MO_2$ and AC'B represent the operation under ideal free conditions. In fact, the graphs are distorted by various disruptive phenomena of mechanical, electrical and magnetic origin.

If $x$ is the distance covered by the heads 119–122 between tracks A and B, then the speed $V(t)$ can be expressed as follows:

$$V(t) = dx/dt = k_1 t + b_1 \qquad (I)$$

in the case of segment $O_1M$, with $k_1 > 0$, and $$V(t) = k_2 t + b_2 \qquad (II)$$

in the case of segment $MO_2$, with $k_2 < 0$.

Assuming that $b_1 = 0$, the position $x$ can be expressed as $x = k_1 t^2/2 + K$. Since $x = 0$ when $t = 0$, $K = 0$ and $t = \sqrt{2x/k_1}$. Hence, $$V(x) = k_1 \sqrt{2x/k_1} = \sqrt{2k_1 x} \qquad (III)$$

A similar or corresponding equation is derived from equation (II). Thus, the graph of speed as a function of position, $V(x)$, is represented by the two parabolic arcs AC' and C'B, shown in FIG. 1c.

To provide effective braking and accurate positioning of the heads 119–122 with respect to track B, the known control apparatus preferably supervise the second bang or deceleration phase. In a known magnetic disc memory 104, the control assembly operates freely during the first bang, as shown by straight line segment $O_1M$ in FIG. 1b. During the second bang, the control apparatus operates under controlled conditions, whereby the speed of the coil 111 and carriage 108 is compared to a reference speed. The representative curves $V(x)$ and $V(t)$ are shown in FIGS. 2a and 2b, respectively.

Curves $V_2$, $V_4$ and $V'_2$, $V'_4$ represent the worst possible case, wherein the maximum speed achieved by the movable assembly 102 during the first bang is lowest. Curves $V_1$ and $V'_1$, represent the best possible operation in the first bang, i.e., attainment of maximum speed. Due to various disruptive phenomena, the actual curves lie somewhere therebetween.

As indicated, in control apparatus of the bang-bang type, a series of theoretical reference speeds, which is a function of position $x$, is selected to effect control. To substantially avoid or minimize the effect of the disruptive phenomena, the theoretical reference speeds correspond to the worst case, i.e., curves $V_2$ and $V_4$ of FIG. 2a.

Thus, the actual speed of the carriage 108 during the second bang, as a function of position $x$, substantially coincides with the curve $V_4$, regardless of the speed achieved in the first bang. If time $t = 0$ at point A, the movable assembly 102 moves from track A to track B in $t_2$, as shown in FIG. 2b.

More particularly, assume that the movable assembly 102 operates as shown by curves $V_1$, $V'_1$ during the first bang, i.e., the best case. During the second bang, the curves representing actual speed, $V_3$ and $V'_3$, virtually coincide with curves $V_4$ and $V'_4$, as the movable assembly 102 nears track B. The time taken to travel from track A to track B is, therefore, $t_2$ for all possible cases and conditions. As such, mean access time cannot be reduced.

In the preferred embodiment of the present invention described herein, the theoretical reference speeds are a function of the actual speed achieved by the movable assembly 102 during the first bang. Referring to FIG. 3a, curves $V_6$, $V_8$ and $V_5$, $V_7$, represent the worst and best cases, respectively. Curves $V'_6$, $V'_8$ and $V'_5$, $V'_7$, shown in FIG. 3b, respectively correspond to the curves for $V(x)$ in FIG. 3a.

In the worst and best cases, the time taken by the movable head assembly 102 to cover the distance AB is $t_2$ and $t_3$, respectively, $t_3 < t_2$. For any intermediate case, the time is less than $t_2$. Thus, the control apparatus 100 substantially reduces the average access times, including the mean access time.

Figure 4:
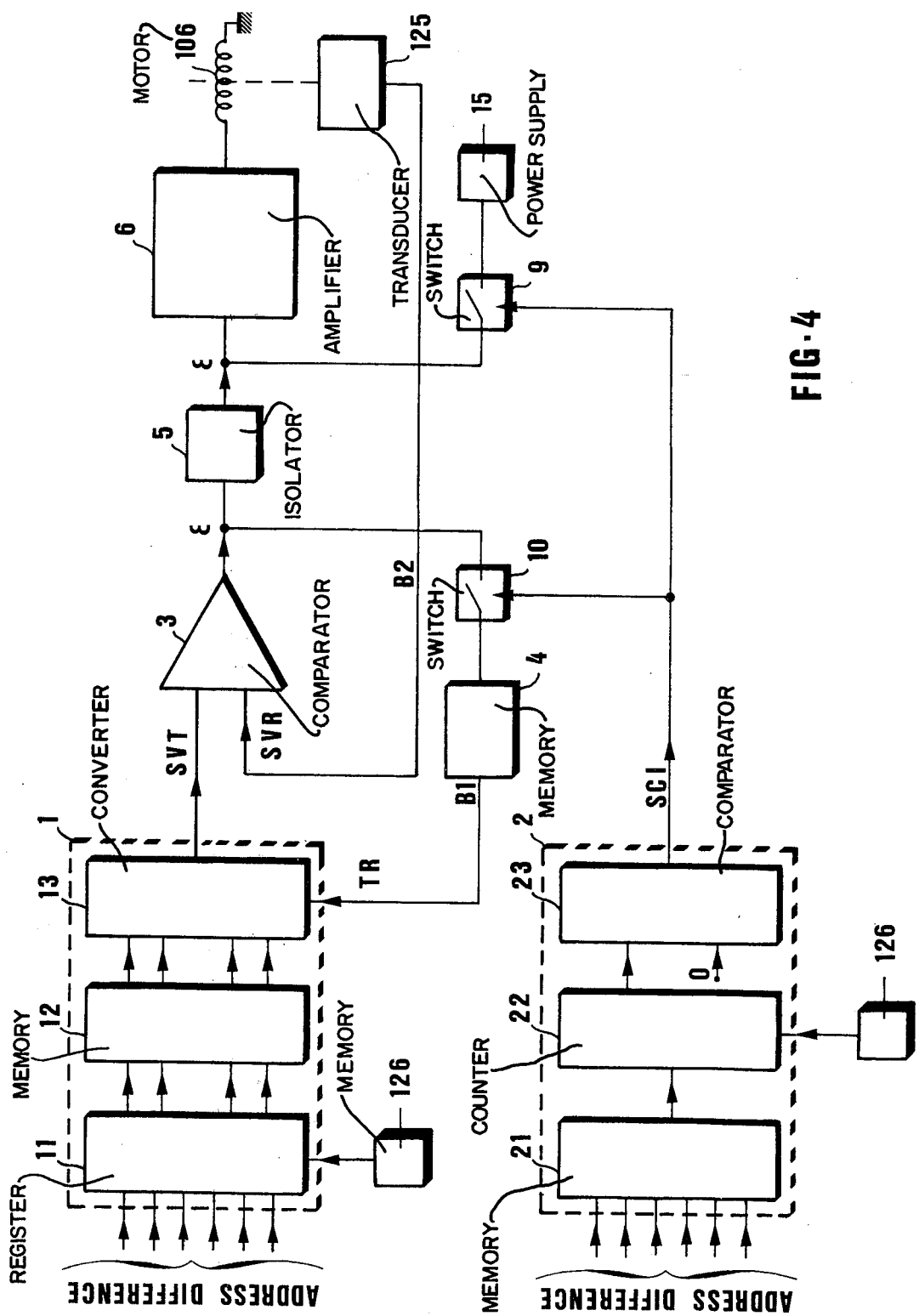
FIG. 4 is a schematic block diagram of a preferred embodiment of the present invention.

The control apparatus 100 is shown in schematic detail in FIG. 4. The control apparatus includes first memory means, designated 1, for setting the theoretical reference speed for the movable head assembly 102, means designated 2, for controlling inversion between the first and second bang by reversal of current to the coil 111, a comparator 3, a memory 4, an isolator 5, a power amplifier 6, motor 106, speed transducer 125, switches 9 and 10, and a power supply 15, interconnected as shown.

The comparator 3, isolator 5, power amplifier 6, motor 106 and speed transducer 125 cooperatively define a first control loop $B_2$. The memory means 1, comparator 3, memory 4 and switch 10 cooperatively define a second control loop $B_1$.

First memory means 1 has in store a series of discrete values representing arbitrary theoretical speeds as a function of the distance $x$ to be covered. The arbitrary speeds relate to the ideal case speeds where all the parameters governing the movement of the movable assembly are precisely known and do not change. The arbitrary speeds are mathematically determined therefrom taking into account the mechanical characteristics of the movable head assembly 102 and electrical characteristics of the motor 106, such as the self induction of the coil 111. A series of theoretical reference speeds for the movable assembly 102 during the second bang are derived from the arbitrary stored speeds in accordance with the actual speed obtained by the assembly 102 during the first bang, as described below. Signal SVT represents the theoretical reference speed signal produced by first memory means 1.

In accordance with the size of the movement, i.e., the number of tracks to be covered, current reversal means 2 defines a number of tracks, N, whereupon the inversion takes place, ending the first bang. When N tracks have been travelled, an order for reversal is given. If N' is the total number of tracks between tracks A and B, N is preferably within a few tracks of N'/2. The reversal ordering signal is designated SCI.

During the first bang, current reversal means 2 energizes and closes switch 10, thereby closing loop $B_1$. Switch 9 is also energized and closed to saturate the power amplifier 6. Thus, the amplifier 6 supplies a constant current to motor 106, regardless of the error or control voltage produced by comparator 3, and operation of the control apparatus 100 is substantially uncontrolled. Isolator 5, a large resistor or switch, isolates loop $B_1$ from the power supply 15.

The speed transducer 125 produces a signal SVR, representing the actual speed of the movable head assembly 102. Signal SVR is compared by comparator 3 with signal SVT to generate the error or control voltage $\epsilon$. The control voltage $\epsilon$ is fed to memory 4 via switch 10. In response, the memory 4 provides a reference voltage TR, which is a function of the control voltage $\epsilon$.

Voltage TR is fed to first memory means 1 to determine and set theoretical reference speeds. Signal SVT is, therefore, a function of signal SVR.

When the point of reversal is reached, the second bang begins and signal SCI opens switches 9 and 10. The change-over or inversion control voltage $\epsilon$ is stored by memory 4 and a constant reference voltage TR is thereafter fed to first memory means 1. With switch 9 open, the linear motor 106 is now effectively driven by the control signal $\epsilon$, as amplified by the power amplifier 6.

First memory means 1 includes an address difference register 11, a memory 12 and a digital-analogue converter 13. The memory 12 has stored therein a series of digital values which define the arbitrary theoretical speeds or deceleration velocities of the carriage 108, for each distance $x$ to be moved or covered.

The address difference register 11 contains the difference in addresses between the starting and destination track, e.g., the number of tracks between tracks A and B. The address difference is received from a peripheral controller or central processing unit (not shown). As the magnetic heads 119–122 move across a track, register 11 receives a pulse from the position transducer 126. The content of the register 11 is reduced by one with each pulse until it is equal to zero.

The arbitrary speed of the movable head assembly 102 may be defined with respect to each track of a fraction thereof. Each address difference contained in the register 11 has corresponding speed values which are expressed in digital form by a binary number. In this preferred embodiment of the present invention, the arbitrary speed is defined to within a quarter of a track. Thus, each address has four corresponding arbitrary speeds stored in memory 12. That is, the address difference for a track D has four arbitrary speeds which relate to D, D + ¼, D + ½, D + ¾, respectively.

The arbitrary speed values are transferred to the analogue converter 13, whereby a series of analogue signals SVA is produced. The converter 13 receives the reference voltage TR from the memory 4 and multiples signal SVA thereby to obtain signal SVT.

Signal SVA continually decreases during the first and second bang. During the first bang, SVT is primarily controlled by and substantially equivalent to SVR. Reference voltage TR changes constantly throughout the first bang to maintain the substantial equivalence of SVT and SVR, since $SVT = (SVA)(TR)$.

As indicated, with change-over or inversion from acceleration to deceleration, the change-over error voltage $\epsilon$ is stored in the memory 4 and reference signal TR remains constant throughout the second bang, as switch 10 is open. The motor 106 is driven by the voltage $\epsilon$ from comparator 3 through amplifier 6, such that signal SVR substantially tracks signal SVT during the second bang. Thus regardless of the operational state of the magnetic disc memory 104, i,e. between the worst and best cases shown in FIGS. 3a and 3b, the access time is less than $t_2$.

Figure 5:
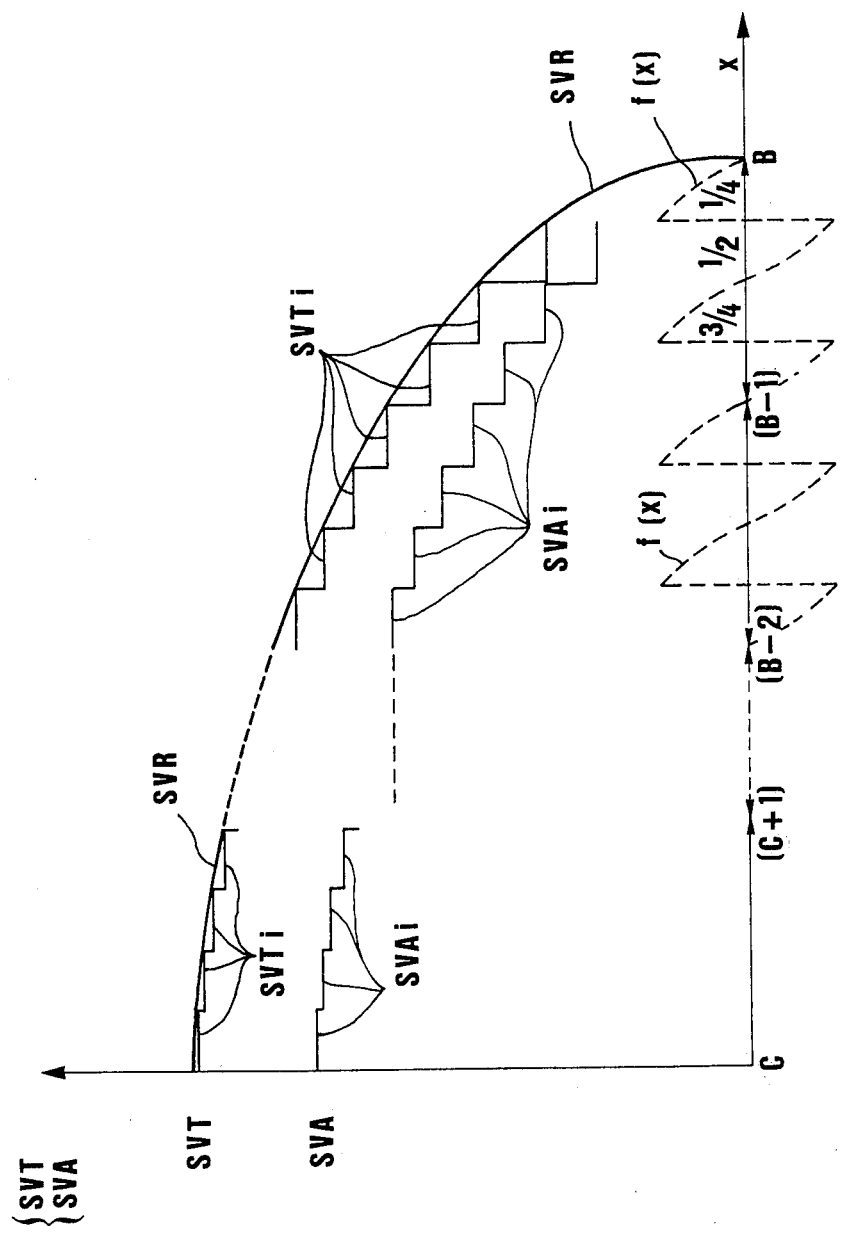
FIG. 5 is a graph illustrating the theoretical reference speeds and actual speed of the movable head assembly, as a function of position.

When the magnetic heads 119–122 are within a quarter track of the destination track B, the motor 106 is, in a known way taken under the control of an analogue signal $f(x)$, which is supplied by the position transducer 126, to accurately position the heads 119–122 with respect to the discs 123, 124. This signal $f(x)$ is shown in FIG. 5.

In this preferred embodiment the memory 12 is a programmable memory or PROM memory. Thus the values of the arbitrary theoretical speeds may be adapted to the characteristics of the movable head assembly.

The current reversal means 2 includes a reversal memory table 21, a backward counter 22 and a zero comparator 23. For each movement, the reversal table 21 selects the number of tracks after which reversal occurs and transfers this number to the backward counter 22. The content of the counter 22 is reduced by one unit as the heads 119–122 pass over each track. When the counter registers zero, the zero comparator causes inversion or reversal. Preferably, the reversal memory table 21 and memory 4 are also a PROM memory.

A single preferred embodiment of the present invention has been described and disclosed. It is to be understood, however, that various changes and modifications can be made without departing from the true scope and spirit of the present invention, as set forth and defined in the following claims.

What is claimed is:

1. An apparatus for positionally controlling a movable head assembly, said apparatus having an acceleration and deceleration state, comprising, in combination:
    a motor drivingly connected to said movable head assembly;
    transducer means for producing a velocity signal representing the speed of said movable head assembly;
    a first and second switch;
    an isolator
    a power supply connected to said motor through said first switch;
    first memory means for setting a series of theoretical velocities for said movable head assembly, said first memory means producing a series of theoretical velocity signals representing said theoretical velocities, said first memory means defining a series of arbitrary velocity signals;
    means for comparing said theoretical velocity signals and said velocity signal to produce an error signal, said comparing means including a pair of inputs connected to said first memory means and said transducer means, respectively, and an output connected to said motor through said isolator;
    second memory means for producing a reference signal in response to said error signal, said second memory means being connected to said output of said comparing means through said second switch, said first memory means being connected to said second memory means for receipt of said reference signal, said theoretical velocity signals being the product of said arbitrary velocity signals and said reference signal; and
    means for controlling inversion between said acceleration and deceleration states, said first and second switches being connected and responsive to said controlling means, said controlling means closing said first and second switches is said acceleration state, whereby said second memory means continually receives said error signal, said motor is connected to said power supply to drive said movable head assembly under substantially free conditions, and said isolator isolates said comparing means from said power supply, said controlling means opening said first and second switches in said deceleration state, whereby said second memory means stores said error signal at inversion, said reference signal becomes constant, and said motor is connected to said output of said comparing means to drive said movable head assembly in response to said error signal, whereby said velocity signal tracks said theoretical velocity signals.

2. An apparatus as claimed in claim 1 wherein said movable head assembly includes a carriage and magnetic heads for reading and writing a magnetic disc.

3. An apparatus as claimed in claim 1 wherein said motor is a linear electrodynamic motor.

4. An apparatus as claimed in claim 1 wherein said arbitrary velocity signals are determined by the distance to be traveled by said movable head assembly.

5. An apparatus as claimed in claim 4 wherein said first memory means includes a memory having stored therein said arbitrary velocity signals in digital form and means for converting said digitial arbitrary velocity signals to analogue arbitrary velocity signals.

6. An apparatus as claimed in claim 5 wherein said converting means receives said reference signal and multiplies said analogue arbitrary velocity signals thereby to produce said theoretical velocity signals.

7. An apparatus as claimed in claim 1 further comprising a power amplifier interposed said motor, said isolator, and said power supply.

* * * * *

UNITED STATES PATENT OFFICE
CERTIFICATE OF CORRECTION

Patent No. 4,031,443      Dated June 21, 1977

Inventor(s) JACQUES PIERRE LEON DROUX and RENE JEAN RODIER

It is certified that error appears in the above-identified patent and that said Letters Patent are hereby corrected as shown below:

Column 8, line 33, after "switches" delete "is"

and substitute therefor --in--.

Signed and Sealed this

Eighth Day of November 1977

[SEAL]

Attest:

RUTH C. MASON
*Attesting Officer*

LUTRELLE F. PARKER
*Acting Commissioner of Patents and Trademarks*